(12) United States Patent
Yamanari et al.

(10) Patent No.: US 11,186,750 B2
(45) Date of Patent: Nov. 30, 2021

(54) PRESSURE-SENSITIVE ADHESIVE TAPE (71) Applicant: NITTO DENKO CORPORATION, Osaka (JP)

(72) Inventors: Yusuke Yamanari, Ibaraki (JP); Makoto Saito, Ibaraki (JP); Naoaki Higuchi, Ibaraki (JP); Kenta Jozuka, Ibaraki (JP)

(73) Assignee: NITTO DENKO CORPORATION, Osaka (JP)

( * ) Notice: Subject to any disclaimer, the term of this patent is extended or adjusted under 35 U.S.C. 154(b) by 0 days.

(21) Appl. No.: 16/633,837

(22) PCT Filed: Jul. 24, 2018

(86) PCT No.: PCT/JP2018/027688
§ 371 (c)(1),
(2) Date: Jan. 24, 2020

(87) PCT Pub. No.: WO2019/069541
PCT Pub. Date: Apr. 11, 2019

(65) Prior Publication Data
US 2020/0165489 A1 May 28, 2020

(30) Foreign Application Priority Data

Oct. 2, 2017 (JP) .............................. JP2017-192819
May 31, 2018 (JP) .............................. JP2018-104828

(51) Int. Cl.
*C09J 7/22* (2018.01)
*C09J 131/04* (2006.01)
*C09J 7/38* (2018.01)
*C09J 133/08* (2006.01)
*C09J 133/10* (2006.01)

(52) U.S. Cl.
CPC ................ *C09J 7/22* (2018.01); *C09J 7/383* (2018.01); *C09J 7/385* (2018.01); *C09J 131/04* (2013.01); *C09J 133/08* (2013.01); *C09J 133/10* (2013.01); *Y10T 428/28* (2015.01); *Y10T 428/2852* (2015.01); *Y10T 428/2891* (2015.01); *Y10T 428/2896* (2015.01)

(58) Field of Classification Search
None
See application file for complete search history.

(56) References Cited

U.S. PATENT DOCUMENTS

| 9,546,303 B2 | 7/2017 | Muta et al. |
| 10,000,668 B2 | 6/2018 | Imoto et al. |
| 2008/0199704 A1* | 8/2008 | Ho ...................... B32B 37/153 |
| | | 428/412 |
| 2013/0052461 A1 | 2/2013 | Muta et al. |
| 2016/0272851 A1 | 9/2016 | Imoto et al. |
| 2016/0376472 A1 | 12/2016 | Park |
| 2017/0158918 A1 | 6/2017 | Jozuka et al. |

FOREIGN PATENT DOCUMENTS

| CN | 104774570 A | 7/2015 |
| CN | 106468795 A | 3/2017 |
| EP | 2 913 373 | 9/2015 |
| JP | 60-006775 | 1/1985 |
| JP | 06-346032 | 12/1994 |
| JP | 2013-049852 | 3/2013 |
| JP | 2015-165023 | 9/2015 |
| JP | 2016-029155 | 3/2016 |
| JP | 2016-113506 | 6/2016 |
| WO | 2015/056467 | 4/2015 |
| WO | 2015/087827 A1 | 6/2015 |
| WO | 2015/135134 | 9/2015 |

OTHER PUBLICATIONS

International Search Report issued in International Pat. Appl. No. PCT/JP2018/0276 88, dated Oct. 2, 2018, English translation.
International Preliminary Report on patentability issued in International Pat. Appl. No. PCT/JP2018/027688, dated Apr. 8, 2020, English translation.
Chinese Office Action dated Jun. 18, 2021, issued in corresponding Chinese patent application No. 201880063997.1 with English machine translation.

* cited by examiner

*Primary Examiner* — Anish P Desai
(74) *Attorney, Agent, or Firm* — Greenblum & Bernstein, P.L.C.

(57) ABSTRACT

Provided is a pressure-sensitive adhesive tape excellent in unevenness followability. The pressure-sensitive adhesive tape of the present invention includes: a base material layer; and a pressure-sensitive adhesive layer arranged on at least one side of the base material layer, wherein the pressure-sensitive adhesive tape has a dimensional change ratio at 23° C. of from 0.20 to 0.39.

10 Claims, 3 Drawing Sheets

PRESSURE-SENSITIVE ADHESIVE TAPE

TECHNICAL FIELD

The present invention relates to a pressure-sensitive adhesive tape.

BACKGROUND ART

A pressure-sensitive adhesive tape has been used in the fixation of structures of various shapes (e.g., Patent Literatures 1 to 3). However, when the pressure-sensitive adhesive tape is bonded to a corner portion (e.g., a corner portion of a wall) or a bending portion (e.g., a movable bending portion of a foldable member), a stress occurs in the pressure-sensitive adhesive tape, and hence the unevenness following of the pressure-sensitive adhesive tape cannot be sufficiently achieved yet.

When the pressure-sensitive adhesive tape is bonded to the corner portion or the bending portion, specifically, such a problem as described below occurs.

When the pressure-sensitive adhesive tape is bent with an angle, a compressing force acts on the radially inner side of the bent tape, and hence the deformation of the pressure-sensitive adhesive tape itself occurs so as to relax the force. Specifically, for example, a wrinkle is liable to occur in the tape.

When the pressure-sensitive adhesive tape is bent with an angle, a stress by which the tape is tensioned acts on the radially outer side of the bent tape. Accordingly, the floating of the tape from an adherend occurs at the time of the relaxation of the stress.

Also under a state in which the thickness of a site of the pressure-sensitive adhesive tape to be bent or a site thereof to be tensioned largely changes, a wrinkle is liable to occur in the tape, or the floating of the tape occurs. For example, when the pressure-sensitive adhesive tape is tensioned, the thickness of the pressure-sensitive adhesive tape remarkably reduces, and hence its floating from an adherend is liable to occur.

As described above, in the related-art pressure-sensitive adhesive tape, unevenness following cannot be sufficiently achieved yet.

In particular, when the pressure-sensitive adhesive tape is bonded to a movable bending portion, bending is repeated, and hence a state in which a bending mark (so-called "curl") is left in the pressure-sensitive adhesive tape on the movable bending portion is established.

CITATION LIST

Patent Literature

[PTL 1] JP 2015-165023 A
[PTL 2] JP 2016-029155 A
[PTL 3] JP 2016-113506 A

SUMMARY OF INVENTION

Technical Problem

An object of the present invention is to provide a pressure-sensitive adhesive tape excellent in unevenness followability.

Solution to Problem

According to one embodiment of the present invention, there is provided a pressure-sensitive adhesive tape, including: a base material layer; and a pressure-sensitive adhesive layer arranged on at least one side of the base material layer, wherein the pressure-sensitive adhesive tape has a dimensional change ratio at 23° C. of from 0.20 to 0.39.

In one embodiment, the pressure-sensitive adhesive tape of the present invention has a Young's modulus at 23° C. of from 0.2 MPa to 25 MPa.

In one embodiment, the pressure-sensitive adhesive tape of the present invention has a maximum stress of from 0.1 MPa to 6.0 MPa at a time of tension thereof by 100% at 23° C. and a tensile rate of 300 mm/min.

In one embodiment, in the pressure-sensitive adhesive tape of the present invention, a ratio (B/A) between a stress A applied to the pressure-sensitive adhesive tape immediately after the pressure-sensitive adhesive tape is tensioned by 100% at 23° C. and a tensile rate of 300 mm/min, and a stress B after holding of the 100% tension state for 1 second is from 0.7 to 1.0.

In one embodiment, the pressure-sensitive adhesive layer has a pressure-sensitive adhesive strength to a SUS plate of 5N/20 mm or more at 23° C., a tensile rate of 300 ram/min, and a peel angle of 180°.

In one embodiment, the pressure-sensitive adhesive tape of the present invention has a total thickness "d" of from 1 µm to 500 µm.

In one embodiment, a ratio (d1/d) of a total thickness d1 of the pressure-sensitive adhesive layer to the total thickness "d" is 0.7 or less.

In one embodiment, the base material layer contains at least one polar functional group-containing polymer selected from a condensation-type polymer and a polyaddition-type polymer.

In one embodiment, the polar functional group-containing polymer is at least one kind selected from polyamide, polyurethane, and polyurea.

In one embodiment, the polar functional group-containing polymer has at least one kind selected from an ether bond and an ester bond.

In one embodiment, the pressure-sensitive adhesive layer contains at least one kind selected from an acrylic pressure-sensitive adhesive, a rubber-based pressure-sensitive adhesive, a silicone-based pressure-sensitive adhesive, and a urethane-based pressure-sensitive adhesive.

Advantageous Effects of Invention

According to the present invention, the pressure-sensitive adhesive tape excellent in unevenness followability can be provided.

DESCRIPTION OF EMBODIMENTS

<<<<Pressure-Sensitive Adhesive Tape>>>>

Figure 1:
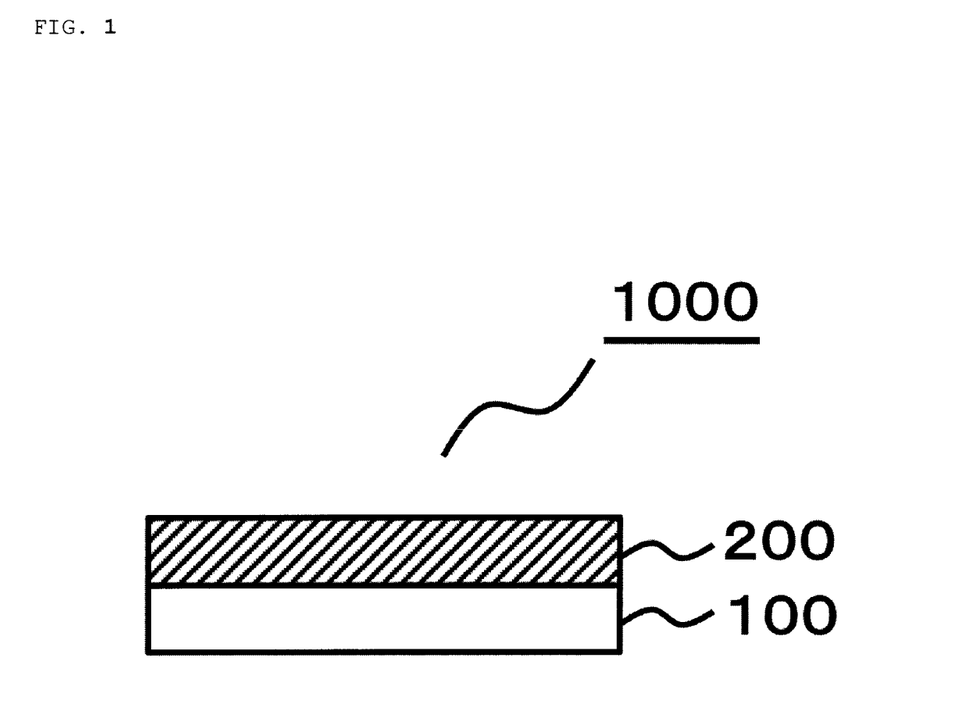
FIG. 1 is a schematic sectional view for illustrating one embodiment in the case where a pressure-sensitive adhesive tape of the present invention is a single-sided pressure-sensitive adhesive tape.
Figure 2:
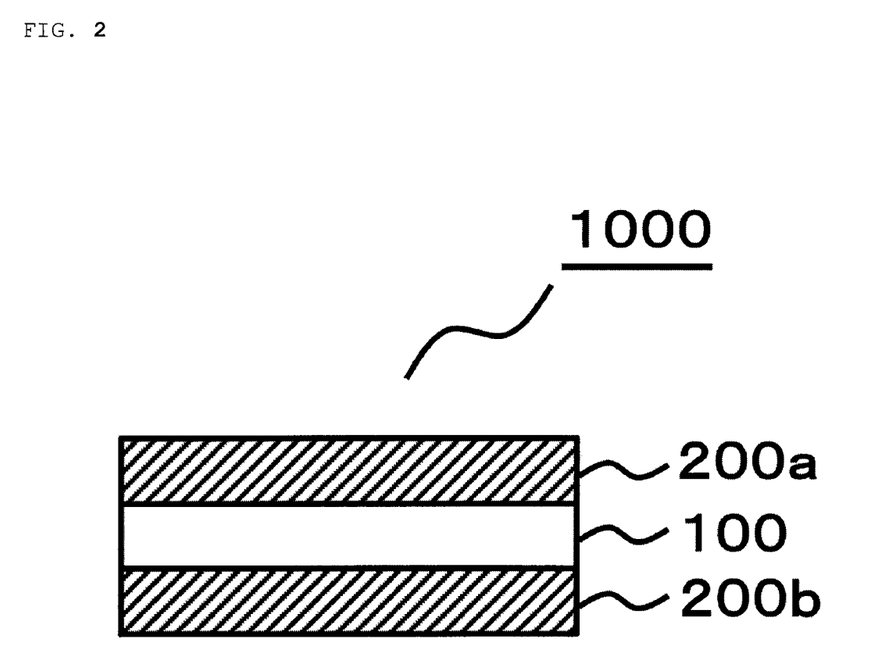
FIG. 2 is a schematic sectional view for illustrating one embodiment in the case where the pressure-sensitive adhesive tape of the present invention is a double-sided pressure-sensitive adhesive tape.

A pressure-sensitive adhesive tape of the present invention is a pressure-sensitive adhesive tape including: a base material layer; and a pressure-sensitive adhesive layer arranged on at least one side of the base material layer. That is, a pressure-sensitive adhesive tape 1000 of the present invention may be a pressure-sensitive adhesive tape (single-sided pressure-sensitive adhesive tape) including a pressure-sensitive adhesive layer 200 only on one side of a base material layer 100 as illustrated in FIG. 1, or may be a pressure-sensitive adhesive tape (double-sided pressure-sensitive adhesive tape) including pressure-sensitive adhesive layers 200a and 200b on both sides of the base material layer 100 as illustrated in FIG. 2.

The number of the base material layers may be one, or may be two or more. The number of the base material layers is preferably one because the effect of the present invention can be further expressed.

The number of the pressure-sensitive adhesive layers arranged on one side of the base material layer may be one, or may be two or more. The number of the pressure-sensitive adhesive layers is preferably one because the effect of the present invention can be further expressed.

The pressure-sensitive adhesive tape of the present invention may include any appropriate other layer except the base material layer and the pressure-sensitive adhesive layer to such an extent that the effect of the present invention is not impaired.

Any appropriate release liner may be arranged on the surface of the pressure-sensitive adhesive layer opposite to the base material layer for, for example, protecting the pressure-sensitive adhesive tape of the present invention until its use.

Examples of the release liner include: a release liner obtained by subjecting the surface of a base material (liner base material), such as paper or a plastic film, to a silicone treatment; and a release liner obtained by laminating a polyolefin-based resin on the surface of a base material (liner base material), such as paper or a plastic film. Examples of the plastic film serving as the liner base material include a polyethylene film, a polypropylene film, a polybutene film, a polybutadiene film, a polymethylpentene film, a polyvinyl chloride film, a vinyl chloride copolymer film, a polyethylene terephthalate film, a polybutylene terephthalate film, a polyurethane film, and an ethylene-vinyl acetate copolymer film.

The thickness of the release liner is preferably from 1 μm to 500 μm, more preferably from 3 μm to 450 μm, still more preferably from 5 μm to 400 μm, particularly preferably from 10 μm to 300 μm.

The total thickness "d" of the pressure-sensitive adhesive tape of the present invention is preferably from 1 μm to 500 μm, more preferably from 5 μm to 400 μm, still more preferably from 10 μm to 350 μm, particularly preferably from 15 μm to 300 μm, most preferably from 20 μm to 250 μm. When the total thickness "d" of the pressure-sensitive adhesive tape of the present invention falls within the range, the effect of the present invention can be further expressed.

The ratio (d1/d) of the total thickness d1 of the pressure-sensitive adhesive layer to the total thickness "d" of the pressure-sensitive adhesive tape of the present invention is preferably 0.7 or less, more preferably from 0.01 to 0.65, still more preferably from 0.05 to 0.6, particularly preferably from 0.1 to 0.57, most preferably from 0.2 to 0.55. When the ratio (d1/d) of the total thickness d1 of the pressure-sensitive adhesive layer to the total thickness "d" of the pressure-sensitive adhesive tape of the present invention falls within the range, the effect of the present invention can be further expressed. The units of the "d" and the d1 are identical to each other.

The dimensional change ratio of the pressure-sensitive adhesive tape of the present invention at 23° C. is from 0.20 to 0.39, preferably from 0.22 to 0.37, more preferably from 0.24 to 0.35, still more preferably from 0.25 to 0.33, particularly preferably from 0.26 to 0.32, most preferably from 0.27 to 0.31. When the dimensional change ratio of the pressure-sensitive adhesive tape of the present invention at 23° C. falls within the range, the pressure-sensitive adhesive tape of the present invention may be excellent in unevenness followability. When the dimensional change ratio of the pressure-sensitive adhesive tape at 23° C. largely falls short of the range, in the case where the tape is bonded to a convex portion of an adherend, its convex portion followability may deteriorate, and hence its floating from the adherend may occur. When the dimensional change ratio of the pressure-sensitive adhesive tape at 23° C. largely exceeds the range, the tape may be liable to flow, and hence a wrinkle may be liable to occur in the tape. A method of measuring the dimensional change ratio is described in detail later.

The Young's modulus of the pressure-sensitive adhesive tape of the present invention at 23° C. is preferably from 0.2 MPa to 25 MPa, more preferably from 1.0 MPa to 20 MPa, still more preferably from 1.0 MPa to 15 MPa, particularly preferably from 1.0 MPa to 10 MPa. When the Young's modulus of the pressure-sensitive adhesive tape of the present invention at 23° C. falls within the range, the effect of the present invention can be further expressed. In the case where the Young's modulus of the pressure-sensitive adhesive tape at 23° C. is less than 0.2 MPa, when the pressure-sensitive adhesive tape is bent with an angle, there is a risk in that tension on its radially outer side cannot be sufficiently held with respect to compression on its radially inner side. Accordingly, there is a risk in that the thickness of the tape is liable to change, and hence the floating thereof from an adherend is liable to occur. In the case where the Young's modulus of the pressure-sensitive adhesive tape at 23° C. is more than 25 MPa, it may be impossible to easily deform the pressure-sensitive adhesive tape. A method of measuring the Young's modulus is described in detail later.

The pressure-sensitive adhesive tape of the present invention has a maximum stress of preferably from 0.1 MPa to 6.0 MPa, more preferably from 0.2 MPa to 5.8 MPa, still more preferably from 0.3 MPa to 5.3 MPa, still further more preferably from 0.5 MPa to 4.8 MPa, particularly preferably from 1.1 MPa to 4.5 MPa, most preferably from 1.7 MPa to 4.3 MPa at the time of its tension by 100% at 23° C. and a tensile rate of 300 mm/min. When the maximum stress of the pressure-sensitive adhesive tape of the present invention at the time of the 100% tension at 23° C. and a tensile rate of 300 mm/min falls within the range, the effect of the present invention can be further expressed. When the maximum stress of the pressure-sensitive adhesive tape at the time of the 100% tension at 23° C. and a tensile rate of 300 mm/min is less than 0.1 MPa, the tape may be liable to easily deform, and hence a problem in terms of its handleability such as processability may occur. When the maximum stress of the pressure-sensitive adhesive tape at the time of the 100% tension at 23° C. and a tensile rate of 300 mm/min is more than 6.0 MPa, a large force may be required at the time of the bending of the pressure-sensitive adhesive tape with an angle. Accordingly, there is a risk in that a compressive stress on the radially inner side of the tape increases, and hence a wrinkle is liable to occur in the tape. A method of measuring the maximum stress is described in detail later.

A ratio (B/A) between a stress A applied to the pressure-sensitive adhesive tape of the present invention immediately after the pressure-sensitive adhesive tape is tensioned by 100% at 23° C. and a tensile rate of 300 ram/min, and a stress B after the holding of the 100% tension state for 1 second is preferably from 0.7 to 1.0, more preferably from 0.73 to 0.97, still more preferably from 0.75 to 0.95, particularly preferably from 0.77 to 0.93, most preferably from 0.80 to 0.90. When the ratio (B/A) between the stress A applied to the pressure-sensitive adhesive tape of the present invention immediately after the pressure-sensitive adhesive tape is tensioned by 100% at 23° C. and a tensile rate of 300 mm/min, and the stress B after the holding of the 100% tension state for 1 second falls within the range, the effect of the present invention can be further expressed. When the ratio (B/A) between the stress A applied to the pressure-sensitive adhesive tape immediately after the pressure-sensitive adhesive tape is tensioned by 100% at 23° C. and a tensile rate of 300 mm/min, and the stress B after the holding of the 100% tension state for 1 second is less than 0.7, the pressure-sensitive adhesive tape is completely elongated in a short time period, and hence the following risk occurs: even when the pressure-sensitive adhesive tape can follow unevenness, in the case where a wrinkle occurs therein, its rebonding or the like cannot be performed; or the thickness of the pressure-sensitive adhesive tape changes. A method of measuring the ratio (B/A) is described in detail later.

The pressure-sensitive adhesive layer of the pressure-sensitive adhesive tape of the present invention has a pressure-sensitive adhesive strength to a SUS plate of preferably 5N/20 mm or more, more preferably from 5N/20 mm to 100N/20 mm, still more preferably from 5N/20 mm to 50N/20 mm, particularly preferably from 5N/20 mm to 30N/20 mm, most preferably from 5N/20 mm to 20N/20 mm at 23° C., a tensile rate of 300 mm/min, and a peel angle of 180°. When the pressure-sensitive adhesive strength of the pressure-sensitive adhesive layer of the pressure-sensitive adhesive tape of the present invention to the SUS plate at 23° C., a tensile rate of 300 mm/min, and a peel angle of 180° falls within the range, the effect of the present invention can be further expressed.

<<Base Material Layer>>

The thickness of the base material layer is preferably from 1 μm to 500 μm, more preferably from 5 μm to 400 μm, still more preferably from 10 μm to 300 μm, particularly preferably from 15 μm to 200 μm, most preferably from 20 μm to 150 μm. When the thickness of the base material layer falls within the range, the effect of the present invention can be further expressed.

Any appropriate material may be adopted as a material for the base material layer to such an extent that the effect of the present invention is not impaired. Such material preferably contains at least one polar functional group-containing polymer selected from a condensation-type polymer and a polyaddition-type polymer. That is, the base material layer preferably contains the at least one polar functional group-containing polymer selected from the condensation-type polymer and the polyaddition-type polymer.

The content of the at least one polar functional group-containing polymer selected from the condensation-type polymer and the polyaddition-type polymer in the base material layer is preferably from 50 wt % to 100 wt % because the effect of the present invention can be further expressed, and the content is more preferably from 70 wt % to 100 wt %, still more preferably from 90 wt % to 100 wt %, particularly preferably from 95 wt % to 100 wt %, most preferably from 98 wt % to 100 wt %.

The at least one polar functional group-containing polymer selected from the condensation-type polymer and the polyaddition-type polymer has a polar functional group, such as a carbonyl group, in its polymer main chain. Accordingly, an intermolecular force stronger than that of a radical polymerization-type polymer acts on the polymer, and hence the polymer may have a network structure that does not depend on a covalent bond. A polymer having a large amount of a network structure that depends on a covalent bond has excessively high elasticity, and hence the unevenness followability of the pressure-sensitive adhesive tape may reduce. In each of the condensation-type polymer and the polyaddition-type polymer each having a network structure that does not depend on a covalent bond, an intermolecular force caused by a polar functional group is weaker than an intermolecular force caused by a covalent bond, and hence the deformation or the like of the tape is easily caused even by smaller energy (energy such as work done by, for example, a stress applied to the tape) to relax the stress. After the relaxation, an intermolecular force acts between the polar functional groups of the polymer again (for example, the combination of the polar functional groups between which an intermolecular force occurs changes), and hence the unevenness followability may be improved; for example, the tape can hold its bent shape.

The polar functional group-containing polymer is preferably at least one kind selected from polyamide, polyurethane, and polyurea. The intermolecular force of a polymer containing a hydrogen-bondable polar functional group (more precisely, a hydrogen-bondable polar functional group having a hydrogen donor property), such as the polyamide, the polyurethane, or the polyurea, is said to be capable of being cleaved (the combination of the hydrogen-bondable functional groups of the polymer between which an intermolecular force occurs is said to be changed) by energy about 1/10 as large as that of a covalent bond, and hence the cleavage of the intermolecular force may be effectively caused by thermal energy applied to the polymer at about room temperature or energy generated by work done by a stress or the like caused by the bending or the like of the pressure-sensitive adhesive tape. Accordingly, the unevenness followability may be further improved.

The base material layer more preferably contains a polar functional group-containing polymer that is the polyaddition-type polymer. In the polyaddition-type polymer, a monomer having various functional groups may be adopted, and an operation of transforming the monomer into the polymer is easy. Various properties can be imparted to the polyaddition-type polymer by exploiting those features.

The polar functional group-containing polymer that is the polyaddition-type polymer may have at least one kind selected from an ether bond and an ester bond. The ether bond may be introduced by adopting a monomer having an ether bond at the time of the production of the polyaddition-type polymer. The ester bond may be introduced by adopting a monomer having an ester bond at the time of the production of the polyaddition-type polymer. For example, when polyurethane is adopted as the polar functional group-containing polymer, polyurethane having an ether bond is, for example, ether-based polyurethane. Polyurethane having an ester bond is, for example, ester-based polyurethane.

When a monomer having an ether bond is adopted at the time of the production of the polyaddition-type polymer, the elasticity of the polyaddition-type polymer can be weakened, and molecular flexibility can be imparted thereto. When a monomer having an ester bond is adopted at the time of the production of the polyaddition-type polymer, rigidity can be imparted to the polyaddition-type polymer. Therefore, for example, when the monomer having an ether bond and the monomer having an ester bond are appropriately combined with each other, or are each adopted alone, at the time of the production of the polyaddition-type polymer, the elasticity and rigidity of the polyaddition-type polymer can be adjusted, and hence the effect of the present invention can be further expressed.

When polyurethane is adopted as the polar functional group-containing polymer, a hydroxy group-containing monomer may be adopted at the time of the production of the polyurethane. When the hydroxy group-containing monomer is adopted at the time of the production of the polyurethane, an isocyanate monomer to be used in a polyaddition reaction at the time of the production of the polyurethane and the hydroxy group-containing monomer may react with each other to introduce a covalent-bondable network structure into the polyurethane. In addition, the hydroxy group-containing monomer can be collectively loaded as a raw material for the polyurethane, and hence labor such as the loading of the raw material for the polyurethane after the preparation of the polyurethane can be simplified.

The polar functional group-containing monomer is preferably polyurethane because the effect of the present invention can be further expressed. The polyurethane is a polymer compound synthesized by subjecting a polyol (e.g., a diol) and a polyisocyanate (e.g., a diisocyanate) at predetermined ratios to a polyaddition reaction.

Examples of the polyol that may be used in the synthesis of the polyurethane include: diols, such as ethylene glycol, propylene glycol, 1,3-propanediol, 1,4-butanediol, 1,5-pentanediol, neopentyl glycol, 1,6-hexanediol, 1,8-octanediol, polyoxytetramethylene glycol, diethylene glycol, polyethylene glycol, and polypropylene glycol; polyester polyols each serving as a polycondensate of the diol and a dicarboxylic acid (e.g., adipic acid, azelaic acid, or sebacic acid); and carbonate diols, such as a polyalkylene carbonate diol. The number of kinds of those polyols may be only one, or may be two or more.

Examples of the polyisocyanate that may be used in the synthesis of the polyurethane include aromatic, aliphatic, and alicyclic diisocyanates, and polymers (e.g., dimers or trimers) of those diisocyanates. Examples of the diisocyanate include tolylene diisocyanate, diphenylmethane diisocyanate, hexamethylene diisocyanate, xylylene diisocyanate, hydrogenated xylylene diisocyanate, isophorone diisocyanate, hydrogenated diphenylmethane diisocyanate, 1,5-naphthylene diisocyanate, 1,3-phenylene diisocyanate, 1,4-phenylene diisocyanate, butane-1,4-diisocyanate, 2,2,4-trimethylhexamethylene diisocyanate, 2,4,4-trimethylhexamethylene diisocyanate, cyclohexane-1,4-diisocyanate, dicyclohexylmethane-4,4-diisocyanate, 1,3-bis(isocyanatomethyl)cyclohexane, methylcyclohexane diisocyanate, and m-tetramethylxylylene diisocyanate. The number of kinds of those polyisocyanates may be only one, or may be two or more.

In addition to the polyol and the polyisocyanate, any other copolymerizable component may be introduced into the polyurethane. Examples of the other copolymerizable component include a monocarboxylic acid, a dicarboxylic acid, a polycarboxylic acid that is trifunctional or more, a hydroxycarboxylic acid, an alkoxycarboxylic acid, and derivatives thereof. The number of kinds of the other copolymerizable components may be only one, or may be two or more. The content of the other copolymerizable component in the polyurethane is preferably less than 30 wt %, more preferably less than 10 wt %, still more preferably less than 5 wt %.

The 100% modulus of the base material layer falls within the range of preferably from 0.5 MPa to 10 MPa, more preferably from 1 MPa to 9 MPa, still more preferably from 1.5 MPa to 8 MPa, particularly preferably from 2 MPa to 7 MPa from the viewpoint of the ease with which the layer deforms.

<<Pressure-Sensitive Adhesive Layer>>

The thickness of the pressure-sensitive adhesive layer is preferably from 1 μm to 500 μm, more preferably from 3 μm to 300 μm, still more preferably from 5 μm to 200 μm, particularly preferably from 7 μm to 100 μm, most preferably from 10 μm to 70 μm. When the thickness of the pressure-sensitive adhesive layer falls within the range, the effect of the present invention can be further expressed.

The pressure-sensitive adhesive layer contains a base polymer. The number of kinds of the base polymers may be only one, or may be two or more. The content of the base polymer in the pressure-sensitive adhesive layer is preferably from 30 wt % to 95 wt % because the effect of the present invention can be further expressed, and the content is more preferably from 40 wt % to 90 wt %, still more preferably from 50 wt % to 80 wt %.

The base polymer is preferably, for example, at least one kind selected from an acrylic polymer, a rubber-based polymer, a silicone-based polymer, and a urethane-based polymer because the effect of the present invention can be further expressed. That is, the pressure-sensitive adhesive layer preferably contains at least one kind selected from an acrylic pressure-sensitive adhesive containing the acrylic polymer, a rubber-based pressure-sensitive adhesive containing the rubber-based polymer, a silicone-based pressure-sensitive adhesive containing the silicone-based polymer, and a urethane-based pressure-sensitive adhesive containing the urethane-based polymer. In the following description, the acrylic pressure-sensitive adhesive is described in detail as a typical example.

<Acrylic Pressure-Sensitive Adhesive>

The acrylic pressure-sensitive adhesive contains the acrylic polymer as its base polymer. The acrylic pressure-sensitive adhesive may contain a tackifying resin. The acrylic pressure-sensitive adhesive may contain a cross-linking agent.

When the acrylic pressure-sensitive adhesive contains the acrylic polymer, the tackifying resin, and the cross-linking agent, the content of the sum total amount of the acrylic polymer, the tackifying resin, and the cross-linking agent with respect to the total amount of the acrylic pressure-sensitive adhesive is preferably 95 wt % or more because the effect of the present invention can be further expressed, and the content is more preferably 97 wt % or more, still more preferably 99 wt % or more.

(Acrylic Polymer)

The acrylic polymer is preferably, for example, a polymerized product of monomer components that contain an alkyl (meth)acrylate as a main monomer and that may further contain a sub-monomer having copolymerizability with the main monomer. The term "main monomer" as used herein refers to a component accounting for more than 50 wt % of the entirety of the monomer components.

For example, a compound represented by the following formula (1) may be suitably used as the alkyl (meth)acrylate.

(1)

Herein, in the formula (1), $R^1$ represents a hydrogen atom or a methyl group, and $R^2$ represents a chain-like alkyl group having 1 to 20 carbon atoms (hereinafter, such range of the number of carbon atoms is sometimes represented as "C1-20"). $R^2$ represents preferably a C1-14 chain-like alkyl group, more preferably a C2-10 chain-like alkyl group, still more preferably a C4-8 chain-like alkyl group from the viewpoint of, for example, the storage modulus of elasticity of the pressure-sensitive adhesive layer. The meaning of the term "chain-like" as used herein comprehends a linear group and a branched group.

Examples of the alkyl (meth)acrylate in which $R^2$ represents a C1-20 chain-like alkyl group include methyl (meth)acrylate, ethyl (meth)acrylate, propyl (meth)acrylate, isopropyl (meth)acrylate, n-butyl (meth)acrylate, isobutyl (meth)acrylate, s-butyl (meth)acrylate, pentyl (meth)acrylate, isopentyl (meth)acrylate, hexyl (meth)acrylate, heptyl (meth)acrylate, 2-ethylhexyl (meth)acrylate, octyl (meth)acrylate, isooctyl (meth)acrylate, nonyl (meth)acrylate, isononyl (meth)acrylate, decyl (meth)acrylate, isodecyl (meth)acrylate, undecyl (meth)acrylate, lauryl (meth)acrylate, tridecyl (meth)acrylate, tetradecyl (meth)acrylate, pentadecyl (meth)acrylate, hexadecyl (meth)acrylate, heptadecyl (meth)acrylate, octadecyl (meth)acrylate, isostearyl (meth)acrylate, nonadecyl (meth)acrylate, and eicosyl (meth)acrylate. The number of kinds of those alkyl (meth)acrylates may be only one, or may be two or more.

The alkyl (meth)acrylate is preferably, for example, n-butyl acrylate (BA) or 2-ethylhexyl acrylate (2EHA) because the effect of the present invention can be further expressed.

The content of the alkyl (meth)acrylate in all the monomer components to be used in the synthesis of the acrylic polymer is preferably 70 wt % or more because the effect of the present invention can be further expressed, and the content is more preferably 85 wt % or more, still more preferably 90 wt % or more. The upper limit of the content of the alkyl (meth)acrylate is preferably 99.5 wt % or less, more preferably 99 wt % or less. However, the acrylic polymer may be obtained by polymerizing substantially only the alkyl (meth)acrylate.

When an alkyl (meth)acrylate in which $R^2$ represents a C4-8 chain-like alkyl group is used, the ratio of the alkyl (meth)acrylate in which $R^2$ represents a C4-8 chain-like alkyl group out of the alkyl (meth)acrylates in the monomer components is preferably 50 wt % or more because the effect of the present invention can be further expressed, and the ratio is more preferably 70 wt % or more, still more preferably 90 wt % or more, particularly preferably 95 wt % or more, most preferably from 99 wt % to 100 wt %.

An acrylic polymer in which n-butyl acrylate (BA) accounts for 50 wt % or more of all the monomer components is given as one embodiment of the acrylic polymer. In this case, the content of n-butyl acrylate (BA) in all the monomer components is preferably more than 50 wt % and 100 wt % or less because the effect of the present invention can be further expressed, and the content is more preferably from 55 wt % to 95 wt %, still more preferably from 60 wt % to 90 wt %, particularly preferably from 63 wt % to 85 wt %, most preferably from 65 wt % to 80 wt %. All the monomer components may further contain 2-ethylhexyl acrylate (2EHA) at a ratio smaller than that of n-butyl acrylate (BA).

An acrylic polymer in which 2-ethylhexyl acrylate (2EHA) accounts for less than 50 wt % of all the monomer components is given as one embodiment of the acrylic polymer. In this case, the content of 2-ethylhexyl acrylate (2EHA) in all the monomer components is preferably more than 0 wt % and 48 wt % or less because the effect of the present invention can be further expressed, and the content is more preferably from 5 wt % to 45 wt %, still more preferably from 10 wt % to 43 wt %, particularly preferably from 15 wt % to 40 wt %, most preferably from 20 wt % to 35 wt %. All the monomer components may further contain n-butyl acrylate (BA) at a ratio larger than that of 2-ethylhexyl acrylate (2EHA).

The acrylic polymer may be copolymerized with any other monomer to such an extent that the effect of the present invention is not impaired. The other monomer may be used for the purpose of, for example, adjusting the glass transition temperature (Tg) of the acrylic polymer or adjusting the pressure-sensitive adhesive performance thereof. As a monomer that may improve the cohesive strength and heat resistance of the pressure-sensitive adhesive, there are given, for example, a sulfonic acid group-containing monomer, a phosphoric acid group-containing monomer, a cyano group-containing monomer, a vinyl ester, and an aromatic vinyl compound. Of those, a vinyl ester is preferred. Specific examples of the vinyl ester include vinyl acetate (VAc), vinyl propionate, and vinyl laurate. Of those, vinyl acetate (VAc) is preferred.

The number of kinds of the "other monomers" may be only one, or may be two or more. The content of the other monomer in all the monomer components is preferably from 0.001 wt % to 40 wt %, more preferably from 0.01 wt % to 40 wt %, still more preferably from 0.1 wt % to 10 wt %, particularly preferably from 0.5 wt % to 5 wt %, most preferably from 1 wt % to 3 wt %.

Examples of the other monomer that may introduce a functional group capable of serving as a cross-linking base point into the acrylic polymer, or that may contribute to an improvement in adhesive strength include a hydroxy group (OH group)-containing monomer, a carboxy group-containing monomer, an acid anhydride group-containing monomer, an amide group-containing monomer, an amino group-containing monomer, an imide group-containing monomer, an epoxy group-containing monomer, (meth)acryloylmorpholine, and a vinyl ether.

An acrylic polymer copolymerized with the carboxy group-containing monomer as the other monomer is given as one embodiment of the acrylic polymer. Examples of the carboxy group-containing monomer include acrylic acid (AA), methacrylic acid (MAA), carboxyethyl (meth)acrylate, carboxypentyl (meth)acrylate, itaconic acid, maleic acid, fumaric acid, crotonic acid, and isocrotonic acid. Of those, the carboxy group-containing monomer is preferably, for example, acrylic acid (AA) or methacrylic acid (MAA), more preferably acrylic acid (AA) because the effect of the present invention can be further expressed.

When the carboxy group-containing monomer is adopted as the other monomer, the content of the other monomer in all the monomer components is preferably from 0.1 wt % to 10 wt % because the effect of the present invention can be further expressed, and the content is more preferably from 0.2 wt % to 8 wt %, still more preferably from 0.5 wt % to 5 wt %, particularly preferably from 0.7 wt % to 4 wt %, most preferably from 1 wt % to 3 wt %.

An acrylic polymer copolymerized with the hydroxy group-containing monomer as the other monomer is given as one embodiment of the acrylic polymer. Examples of the hydroxy group-containing monomer include: hydroxyalkyl (meth)acrylates, such as 2-hydroxyethyl (meth)acrylate, 2-hydroxypropyl (meth)acrylate, 3-hydroxypropyl (meth) acrylate, 2-hydroxybutyl (meth)acrylate, and 4-hydroxybutyl (meth)acrylate; polypropylene glycol mono(meth) acrylate; and N-hydroxyethyl(meth)acrylamide. Of those, the hydroxy group-containing monomer is preferably, for example, a hydroxyalkyl (meth)acrylate including a linear alkyl group having 2 to 4 carbon atoms because the effect of the present invention can be further expressed, and specific examples thereof include 2-hydroxyethyl acrylate (HEA) and 4-hydroxybutyl acrylate (4HBA). The hydroxy group-containing monomer is more preferably 4-hydroxybutyl acrylate (4HBA).

When the hydroxy group-containing monomer is adopted as the other monomer, the content of the other monomer in all the monomer components is preferably from 0.001 wt % to 10 wt % because the effect of the present invention can be further expressed, and the content is more preferably from 0.01 wt % to 5 wt %, still more preferably from 0.02 wt % to 2 wt %, particularly preferably from 0.03 wt % to 1 wt %, most preferably from 0.05 wt % to 0.5 wt %.

The Tg of the base polymer may be, for example, −80° C. or more because the effect of the present invention can be further expressed. The base polymer (suitably the acrylic polymer) is designed so that its Tg may be preferably −15° C. or less from the viewpoint of improving the deformability of the pressure-sensitive adhesive layer with respect to a shear direction. In some embodiments, the Tg of the base polymer is, for example, preferably −25° C. or less, more preferably −40° C. or less, still more preferably −50° C. or less. The base polymer is designed so that its Tg may be, for example, preferably −70° C. or more (more preferably −65° C. or more, still more preferably −60° C. or more) from the viewpoint of improving the cohesiveness and shape recoverability of the polymer.

The Tg of the base polymer refers to a value determined from Fox's equation on the basis of the Tg of a homopolymer of each monomer forming the base polymer and the weight fraction (copolymerization ratio on a weight basis) of the monomer. As described below, Fox's equation is a relational equation between the Tg of a copolymer and the glass transition temperature Tgi of a homopolymer obtained by the homopolymerization of each of monomers forming the copolymer.

$$1/Tg = \Sigma(Wi/Tgi)$$

In Fox's equation described above, Tg represents the glass transition temperature (unit:K) of the copolymer, Wi represents the weight fraction (copolymerization ratio on a weight basis) of a monomer "i" in the copolymer, and Tgi represents the glass transition temperature (unit:K) of the homopolymer of the monomer "i". A value described in a known material is adopted as the Tg of a homopolymer.

Specifically, for example, the following values may each be used as the Tg of a homopolymer.

| | |
|---|---|
| 2-Ethylhexyl acrylate | −70° C. |
| n-Butyl acrylate | −55° C. |
| Acrylic acid | 106° C. |
| 2-Hydroxyethyl acrylate | −15° C. |
| 4-Hydroxybutyl acrylate | −40° C. |

A numerical value described in "Polymer Handbook" (3rd edition, John Wiley & Sons, Inc., 1989) may be used as the Tg of a homopolymer except those listed above. When a plurality of numerical values are described in the above-mentioned "Polymer Handbook", a conventional value is adopted. With regard to a monomer that is not described in the above-mentioned "Polymer Handbook", the catalog value of the manufacturer of the monomer is adopted. A value obtained by a measurement method described in JP 2007-51271 A is used as the Tg of a homopolymer of a monomer which is not described in the above-mentioned "Polymer Handbook" and for which the catalog value of the manufacturer of the monomer is not provided.

Various polymerization methods known as approaches to synthesizing acrylic polymers, such as a solution polymerization method, an emulsion polymerization method, a bulk polymerization method, and a suspension polymerization method, may each be appropriately adopted as a method of obtaining the acrylic polymer. Of those polymerization methods, the solution polymerization method may be preferably used. A collective loading system involving supplying the total amount of the monomer components in one stroke, a continuous supply (dropping) system, a divided supply (dropping) system, or the like may be appropriately adopted as a monomer supply method at the time of the performance of the solution polymerization. A polymerization temperature may be appropriately selected in accordance with, for example, the kinds of the monomers and a solvent to be used, and the kind of a polymerization initiator. The polymerization temperature is preferably 20° C. or more, more preferably 30° C. or more, still more preferably 40° C. or more, and is preferably 170° C. or less, more preferably 160° C. or less, still more preferably 140° C. or less. Such active energy ray irradiation polymerization as described below may be adopted as the method of obtaining the acrylic polymer: photopolymerization performed (typically performed in the presence of a photopolymerization initiator) by irradiating the monomer components with light such as UV; or radiation polymerization performed by irradiating the monomer components with a radiation such as a β ray or a γ ray.

The solvent (polymerization solvent) to be used in the solution polymerization may be appropriately selected from any appropriate organic solvents. Examples thereof include: aromatic compounds (typically aromatic hydrocarbons), such as toluene; acetic acid esters, such as ethyl acetate; and aliphatic or alicyclic hydrocarbons, such as hexane and cyclohexane.

The initiator (polymerization initiator) to be used in the polymerization may be appropriately selected from any appropriate polymerization initiators in accordance with the kind of the polymerization method. The number of kinds of the polymerization initiators may be only one, or may be two or more. Examples of such polymerization initiator include: azo-based polymerization initiators, such as 2,2'-azobisisobutyronitrile (AIBN); persulfuric acid salts, such as potassium persulfate; peroxide-based initiators, such as benzoyl peroxide and hydrogen peroxide; substituted ethane-based initiators, such as phenyl-substituted ethane; and aromatic carbonyl compounds. Other examples of the polymerization initiator include redox-type initiators each obtained by combining a peroxide and a reducing agent.

The usage amount of the polymerization initiator is preferably from 0.005 part by weight to 1 part by weight, more preferably from 0.01 part by weight to 1 part by weight with respect to 100 parts by weight of all the monomer components.

The acrylic polymer has an Mw of preferably from $10 \times 10^4$ to $500 \times 10^4$, more preferably from $10 \times 10^4$ to $150 \times 10^4$, still more preferably from $20 \times 10^4$ to $75 \times 10^4$, particularly preferably from $35 \times 10^4$ to $65 \times 10^4$. Herein, the Mw refers to a value in terms of standard polystyrene obtained by gel permeation chromatography (GPC). For example, a product available under the model name "HLC-8320GPC" (column: TSKgel GMH-H(S), manufactured by Tosoh Corporation) may be used as a GPC apparatus.

(Tackifying Resin)

The acrylic pressure-sensitive adhesive may contain a tackifying resin because the effect of the present invention can be further expressed. Examples of the tackifying resin include a rosin-based tackifying resin, a terpene-based tackifying resin, a hydrocarbon-based tackifying resin, an epoxy-based tackifying resin, a polyamide-based tackifying resin, an elastomer-based tackifying resin, a phenol-based tackifying resin, and a ketone-based tackifying resin. The number of kinds of the tackifying resins may be only one, or may be two or more.

The usage amount of the tackifying resin is preferably from 5 parts by weight to 70 parts by weight with respect to 100 parts by weight of the base polymer because the effect of the present invention can be further expressed, and the usage amount is more preferably from 10 parts by weight to 60 parts by weight, still more preferably from 15 parts by weight to 50 parts by weight, still further more preferably from 20 parts by weight to 45 parts by weight, particularly preferably from 25 parts by weight to 40 parts by weight, most preferably from 25 parts by weight to 35 parts by weight.

The tackifying resin preferably contains a tackifying resin TL having a softening point of less than 105° C. because the effect of the present invention can be further expressed. The tackifying resin TL can effectively contribute to an improvement in deformability of the pressure-sensitive adhesive layer in its plane direction (shear direction). The softening point of a tackifying resin to be used as the tackifying resin TL is preferably from 50° C. to 103° C., more preferably from 60° C. to 100° C., still more preferably from 65° C. to 95° C., particularly preferably from 70° C. to 90° C., most preferably from 75° C. to 85° C. from the viewpoint of obtaining a higher deformability-improving effect.

The softening point of the tackifying resin is defined as a value measured on the basis of a softening point test method (ring and ball method) specified in JIS K5902 and JIS K2207. Specifically, the sample is forthwith fused at as low a temperature as possible, and the fused sample is filled into a ring placed on a flat metal plate while attention is paid so that no bubbles may occur therein. After the sample has been cooled, a portion rising from a plane including the upper end of the ring is cut off with a knife that has been somewhat heated. Next, a support (ring stand) is loaded into a glass vessel (heating bath) having a diameter of 85 mm or more and a height of 127 mm or more, and glycerin is poured into the vessel until its depth becomes 90 mm or more. Next, a steel ball (having a diameter of 9.5 mm and a weight of 3.5 g) and the ring filled with the sample are immersed in glycerin so as not to be in contact with each other, and the temperature of glycerin is kept at 20° C.±5° C. for 15 minutes. Next, the steel ball is mounted on the center of the surface of the sample in the ring, and the resultant is placed at a fixed position on the support. Next, a distance from the upper end of the ring to the surface of glycerin is kept at 50 mm. A temperature gauge is placed in the vessel, and the position of the center of the mercury ball of the temperature gauge is set at the same height as that of the center of the ring, followed by the heating of the vessel. The flame of a Bunsen burner to be used in the heating is brought into contact with a midpoint between the center and edge of the bottom of the vessel so that the heating may be uniformly performed. The rate at which the temperature of the bath increases after having reached 40° C. since the start of the heating needs to be 5.0° C.±0.5° C. per minute. A temperature when the sample gradually softens to flow down from the ring, and is finally brought into contact with the bottom plate of the ring is read, and the read temperature is adopted as the softening point. The simultaneous measurement of the softening points of two or more samples is performed, and the average of the measured values is adopted.

The usage amount of the tackifying resin TL is preferably from 5 parts by weight to 50 parts by weight with respect to 100 parts by weight of the base polymer because the effect of the present invention can be further expressed, and the usage amount is more preferably from 10 parts by weight to 45 parts by weight, still more preferably from 15 parts by weight to 40 parts by weight, particularly preferably from 20 parts by weight to 35 parts by weight, most preferably from 25 parts by weight to 32 parts by weight.

One or two or more kinds appropriately selected from those each having a softening point of less than 105° C. out of the tackifying resins listed above may each be adopted as the tackifying resin TL. The tackifying resin TL preferably contains a rosin-based resin.

Examples of the rosin-based resin that may be preferably adopted as the tackifying resin TL include rosin esters, such as an unmodified rosin ester and a modified rosin ester. An example of the modified rosin ester is a hydrogenated rosin ester.

The tackifying resin TL preferably contains a hydrogenated rosin ester because the effect of the present invention can be further expressed. The softening point of the hydrogenated rosin ester is preferably less than 105° C. because the effect of the present invention can be further expressed, and the softening point is more preferably from 50° C. to 100° C., still more preferably from 60° C. to 90° C., particularly preferably from 70° C. to 85° C., most preferably from 75° C. to 85° C.

The tackifying resin TL may contain a non-hydrogenated rosin ester. The term "non-hydrogenated rosin ester" as used herein is a concept comprehensively referring to those except the hydrogenated rosin ester out of the above-mentioned rosin esters. Examples of the non-hydrogenated rosin ester include an unmodified rosin ester, a disproportionated rosin ester, and a polymerized rosin ester.

The softening point of the non-hydrogenated rosin ester is preferably less than 105° C. because the effect of the present invention can be further expressed, and the softening point is more preferably from 50° C. to 100° C., still more preferably from 60° C. to 90° C., particularly preferably from 70° C. to 85° C., most preferably from 75° C. to 85° C.

The tackifying resin TL may contain any other tackifying resin in addition to the rosin-based resin. One or two or more kinds appropriately selected from those each having a softening point of less than 105° C. out of the tackifying resins listed above may each be adopted as the other tackifying resin. The tackifying resin TL may contain, for example, the rosin-based resin and a terpene resin.

The content of the rosin-based resin in the entirety of the tackifying resin TL is preferably more than 50 wt % because the effect of the present invention can be further expressed, and the content is more preferably from 55 wt % to 100 wt %, still more preferably from 60 wt % to 99 wt %, particularly preferably from 65 wt % to 97 wt %, most preferably from 75 wt % to 97 wt %.

The tackifying resin may contain the tackifying resin TL and a tackifying resin TH having a softening point of 105°

C. or more (preferably from 105° C. to 170° C.) in combination because the effect of the present invention can be further expressed.

One or two or more kinds appropriately selected from those each having a softening point of 105° C. or more out of the tackifying resins listed above may each be adopted as the tackifying resin TH. The tackifying resin TH may contain at least one kind selected from rosin-based tackifying resins (e.g., rosin esters) and terpene-based tackifying resins (e.g., a terpene phenol resin).

(Cross-Linking Agent)

A cross-linking agent may be incorporated into the acrylic pressure-sensitive adhesive. The number of kinds of the cross-linking agents may be only one, or may be two or more. The use of the cross-linking agent can impart a moderate cohesive strength to the acrylic pressure-sensitive adhesive. The cross-linking agent may be useful in regulating an offset distance and a return distance in a holding power test. The acrylic pressure-sensitive adhesive containing the cross-linking agent may be obtained by, for example, forming the pressure-sensitive adhesive layer through the use of a pressure-sensitive adhesive composition containing the cross-linking agent. The cross-linking agent may be incorporated in, for example, a post-cross-linking reaction form, a pre-cross-linking reaction form, a form partially subjected to a cross-linking reaction, or an intermediate or composite form thereof into the acrylic pressure-sensitive adhesive. In typical cases, the cross-linking agent is exclusively incorporated in the post-cross-linking reaction form into the acrylic pressure-sensitive adhesive.

The usage amount of the cross-linking agent is preferably from 0.005 part by weight to 10 parts by weight with respect to 100 parts by weight of the base polymer because the effect of the present invention can be further expressed, and the usage amount is more preferably from 0.01 part by weight to 7 parts by weight, still further more preferably from 0.05 part by weight to 5 parts by weight, particularly preferably from 0.1 part by weight to 4 parts by weight, most preferably from 1 part by weight to 3 parts by weight.

Examples of the cross-linking agent include an isocyanate-based cross-linking agent, an epoxy-based cross-linking agent, a silicone-based cross-linking agent, an oxazoline-based cross-linking agent, an aziridine-based cross-linking agent, a silane-based cross-linking agent, an alkyl etherified melamine-based cross-linking agent, a metal chelate-based cross-linking agent, and a cross-linking agent such as a peroxide. Of those, an isocyanate-based cross-linking agent and an epoxy-based cross-linking agent are preferred, and an isocyanate-based cross-linking agent is more preferred because the effect of the present invention can be further expressed.

A compound having two or more isocyanate groups (including an isocyanate regenerative functional group obtained by temporarily protecting an isocyanate group by means of, for example, a blocking agent or oligomerization) in a molecule thereof may be used as the isocyanate-based cross-linking agent. Examples of the isocyanate-based cross-linking agent include: aromatic isocyanates, such as tolylene diisocyanate and xylene diisocyanate; alicyclic isocyanates, such as isophorone diisocyanate; and aliphatic isocyanates, such as hexamethylene diisocyanate.

More specific examples of the isocyanate-based cross-linking agent include: lower aliphatic polyisocyanates, such as butylene diisocyanate and hexamethylene diisocyanate; alicyclic isocyanates, such as cyclopentylene diisocyanate, cyclohexylene diisocyanate, and isophorone diisocyanate; aromatic diisocyanates, such as 2,4-tolylene diisocyanate, 4,4'-diphenylmethane diisocyanate, xylylene diisocyanate, and polymethylene polyphenyl isocyanate; isocyanate adducts, such as a trimethylolpropane/tolylene diisocyanate trimer adduct (e.g., product name: CORONATE L, manufactured by Tosoh Corporation), a trimethylolpropane/hexamethylene diisocyanate trimer adduct (e.g., product name: CORONATE HL, manufactured by Tosoh Corporation), and an isocyanurate form of hexamethylene diisocyanate (e.g., product name: CORONATE HX, manufactured by Tosoh Corporation); a trimethylolpropane adduct of xylylene diisocyanate (e.g., product name: TAKENATE D110N, manufactured by Mitsui Chemicals, Inc.), a trimethylolpropane adduct of xylylene diisocyanate (e.g., product name: TAKENATE D120N, manufactured by Mitsui Chemicals, Inc.), a trimethylolpropane adduct of isophorone diisocyanate (e.g., product name: TAKENATE D140N, manufactured by Mitsui Chemicals, Inc.), and a trimethylolpropane adduct of hexamethylene diisocyanate (e.g., product name: TAKENATE D160N, manufactured by Mitsui Chemicals, Inc.); polyether polyisocyanate, polyester polyisocyanate, and adducts of those compounds and various polyols; and polyisocyanates each of which is polyfunctionalized with an isocyanurate bond, a biuret bond, or an alophanate bond. Of those, aromatic isocyanates and alicyclic isocyanates are preferred from the viewpoint that the deformability and the cohesive strength can be well balanced.

The usage amount of the isocyanate-based cross-linking agent is preferably from 0.005 part by weight to 10 parts by weight with respect to 100 parts by weight of the base polymer because the effect of the present invention can be further expressed, and the usage amount is more preferably from 0.01 part by weight to 7 parts by weight, still further more preferably from 0.05 part by weight to 5 parts by weight, particularly preferably from 0.1 part by weight to 4 parts by weight, most preferably from 1 part by weight to 3 parts by weight.

When the monomer components forming the acrylic polymer contain a hydroxy group-containing monomer, a weight ratio "isocyanate-based cross-linking agent/hydroxy group-containing monomer" is preferably more than 20 and less than 50 because the effect of the present invention can be further expressed, and the weight ratio is more preferably from 22 to 45, still more preferably from 25 to 40, particularly preferably from 27 to 40, most preferably from 30 to 35.

When the acrylic pressure-sensitive adhesive contains the tackifying resin TL having a softening point of 105° C. or less, a weight ratio "tackifying resin TL/isocyanate-based cross-linking agent" is preferably more than 2 and less than 15 because the effect of the present invention can be further expressed, and the weight ratio is more preferably from 5 to 13, still more preferably from 7 to 12, particularly preferably from 7 to 11.

A polyfunctional epoxy compound having two or more epoxy groups in a molecule thereof may be used as the epoxy-based cross-linking agent. Examples of the epoxy-based cross-linking agent include N,N,N',N'-tetraglycidyl-m-xylenediamine, diglycidylaniline, 1,3-bis(N,N-diglycidylaminomethyl)cyclohexane, 1,6-hexanediol diglycidyl ether, neopentyl glycol diglycidyl ether, ethylene glycol diglycidyl ether, propylene glycol diglycidyl ether, polyethylene glycol diglycidyl ether, polypropylene glycol diglycidyl ether, sorbitol polyglycidyl ether, glycerol polyglycidyl ether, pentaerythritol polyglycidyl ether, polyglycerol polyglycidyl ether, sorbitan polyglycidyl ether, trimethylolpropane polyglycidyl ether, adipic acid diglycidyl ester, o-phthalic acid diglycidyl ester, triglycidyl-tris(2-hydroxyethyl) isocyanurate, resorcin diglycidyl ether, bisphenol-S-diglycidyl ether, and an epoxy-based resin having two or more epoxy groups in a molecule thereof. As a commercial product of the epoxy-based cross-linking agent, there is given, for example, a product available under the product name "TETRAD C" or "TETRAD X" from Mitsubishi Gas Chemical Company.

The usage amount of the epoxy-based cross-linking agent is preferably from 0.005 part by weight to 10 parts by weight with respect to 100 parts by weight of the base polymer because the effect of the present invention can be further expressed, and the usage amount is more preferably from 0.01 part by weight to 5 parts by weight, still further more preferably from 0.015 part by weight to 1 part by weight, still further more preferably from 0.015 part by weight to 0.5 part by weight, particularly preferably from 0.015 part by weight to 0.3 part by weight, most preferably from 0.15 part by weight to 0.3 part by weight.

(Other Components)

The acrylic pressure-sensitive adhesive may contain any one of various additives that are general in the field of a pressure-sensitive adhesive, such as a leveling agent, a cross-linking aid, a plasticizer, a softening agent, a filler, an antistatic agent, an age resistor, a UV absorber, an antioxidant, and a light stabilizer, as required. Conventionally known additives may be used as such various additives by ordinary methods.

<<<<Applications>>>>

The pressure-sensitive adhesive tape of the present invention is excellent in unevenness followability. The tape may be preferably used in, for example, a mode in which the tape is bonded to a member having a movable bending portion through the exploitation of the feature.

EXAMPLES

Now, the present invention is more specifically described by way of Examples and Comparative Example. However, the present invention is by no means limited thereto. In the following description, the terms "part(s)" and "%" are by weight unless otherwise stated.

<Dimensional Change Ratio>

Figure 3:
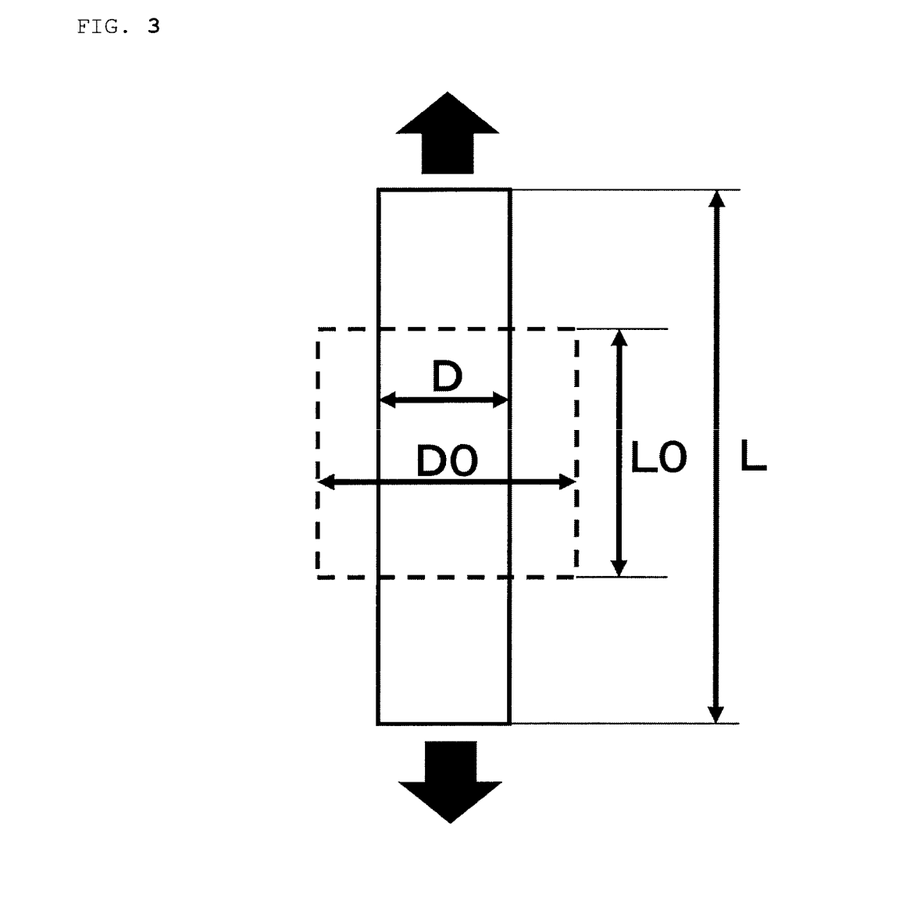
FIG. 3 is an explanatory view for calculating a dimensional change ratio.

A pressure-sensitive adhesive tape was cut into a belt shape having a width of 20 mm to produce a test sample. Under an environment at 23° C. and 50% RH, the measurement sample was tensioned with a tensile tester (manufactured by Shimadzu Corporation, name:Autograph AG-IS) at an initial chuck-to-chuck distance set to 20 mm and a tensile rate of 300 mm/min in its longitudinal direction so that its deformation amount became 100% (i.e., the length of the measurement sample became twice as long as its original length), followed by the calculation of its dimensional change ratio in accordance with the following equation. As illustrated in FIG. 3, L represents the length of the sample in the longitudinal direction (tensile direction) after the tension, and D represents the length thereof in its lateral direction (direction perpendicular to the tensile direction) after the tension.

L0 represents the length of the sample in the longitudinal direction before the tension and D0 represents the length of the sample in the lateral direction before the tension.

Dimensional change ratio=$\{(D-D0)/D0\}/\{(L-L0)/L0\}$

<Young's Modulus>

The Young's modulus of a pressure-sensitive adhesive sheet serving as a sample is calculated on the basis of the results of a 20% elongation test performed under the following conditions. The same method is adopted in Examples and Comparative Example to be described later.

[20% Elongation Test]

Sample shape: A belt shape having a width of 10 mm
Initial chuck-to-chuck distance: 20 mm
Tensile rate: 300 mm/min
Tensile deformation amount: 20%

Procedure: Under a measurement environment at 23° C. and 50% RH, the sample was clamped by the chucks of a tensile tester so that the initial chuck-to-chuck distance became 20 mm. Then, the sample was elongated at the tensile rate until the chuck-to-chuck distance became 24 mm (20% elongation), followed by the calculation of its Young's modulus from the results of its displacement and stress thus obtained.

A tensile direction in the test is not particularly limited, but is preferably matched with the lengthwise direction of the pressure-sensitive adhesive sheet. A product available under the product name "Autograph AG-10G Tensile Tester" from Shimadzu Corporation may be used as the tensile tester.

<Maximum Stress>

The maximum stress of a pressure-sensitive adhesive sheet serving as a sample is calculated on the basis of the results of a 100% elongation test performed under the following conditions. The same method is adopted in Examples and Comparative Example to be described later.

[100% Elongation Test]

Sample shape: A belt shape having a width of 10 mm
Initial chuck-to-chuck distance: 20 mm
Tensile rate: 300 mm/min
Tensile deformation amount: 100%

Procedure: Under a measurement environment at 23° C. and 50% RH, the sample was clamped by the chucks of a tensile tester so that the initial chuck-to-chuck distance became 20 mm. Then, the maximum stress (tensile stress) (MPa) at the time of the elongation of the sample at the tensile rate until the chuck-to-chuck distance became 40 mm (100% elongation) was measured, and was adopted as the maximum stress.

<Stress Ratio (B/A)>

A ratio between a tensile stress (A) immediately after the 100% elongation in the 100% elongation test and a tensile stress (B) after the lapse of 1 second in a state in which the 100% elongation was held was adopted as a stress ratio (B/A).

<Pressure-Sensitive Adhesive Strength>

The pressure-sensitive adhesive strength of a pressure-sensitive adhesive sheet refers to a 180-degree peel strength (180-degree peeling pressure-sensitive adhesive strength) to a stainless-steel plate. The 180-degree peel strength was measured as described below. A single-sided pressure-sensitive adhesive tape (product name: "No. 31B", manufactured by Nitto Denko Corporation, total thickness: 50 μm) was bonded to the back surface of the pressure-sensitive adhesive sheet, and then the pressure-sensitive adhesive sheet was cut into a size measuring 20 mm wide by 100 mm long to provide a measurement sample. Under an environment at 23° C. and 50% RH, a 2-kilogram roll was reciprocated once to crimp the adhesive surface of the measurement sample onto the surface of a stainless-steel plate (SUS304BA plate). The resultant was left to stand under the environment for 30 minutes, and then its peel strength (N/20 mm) was measured with a universal tensile and compression testing machine in conformity with JIS Z 0237:2000 under the conditions of a tensile rate of 300 mm/min and a peel angle of 180°. For example, "Tensile and Compression Testing Machine TG-1 kN" manufactured by Minebea Co., Ltd. may be used as the universal tensile and compression testing machine.

<Bending Resistance Evaluation>

The pressure-sensitive adhesive tape was cut into a belt shape having a width of 10 mm to produce a test sample. Under an environment at 23° C. and 50% RH, a release liner was peeled from the test sample, and a 2-kilogram roller was reciprocated once to crimp a pressure-sensitive adhesive surface exposed by the peeling onto a PET film serving as an adherend (manufactured by Toray Industries, Inc., LUMIRROR S10, thickness: 200 μm) so that the pressure-sensitive adhesive surface was bonded to an area measuring 10 mm wide by 20 mm long. The test sample bonded to the adherend as described above was left to stand under the environment for 5 minutes. After that, the PET film was bent by 180° in a direction perpendicular to the lengthwise direction of the tape, and was then bent again by 180° in a direction opposite to the bending direction (i.e., the film was bent upward by 180°, and was then bent downward by 180°). A case in which floating (gap), a wrinkle, or a tint change, such as whitening, which could be visually observed did not occur between the tape and the PET at the site bent twice was indicated by Symbol "o", and a case in which at least one of these troubles occurred therebetween was indicated by Symbol "x".

Example 1

30 Parts of 2-ethylhexyl acrylate (2EHA), 70 parts of n-butyl acrylate (BA), 2 parts of acrylic acid (AA), and 0.1 part of 4-hydroxybutyl acrylate (4HBA) serving as monomer components, 0.08 part of 2,2'-azobisisobutyronitrile (AIBN) serving as a polymerization initiator, and 150 parts of toluene serving as a polymerization solvent were loaded into a reaction vessel including a stirring machine, a temperature gauge, a nitrogen gas-introducing tube, and a condenser, and were subjected to solution polymerization at 65° C. for 8 hours to provide a toluene solution of an acrylic polymer (A). The acrylic polymer (A) had a weight-average molecular weight of 440,000.

30 Parts of a tackifying resin TA (manufactured by Harima Chemicals, Inc., hydrogenated rosin glycerin ester, product name: "HARITACK SE10", softening point: from 75° C. to 85° C.) and 2.7 parts of an isocyanate-based cross-linking agent (manufactured by Tosoh Corporation, product name: "CORONATE L") were added to 100 parts of the acrylic polymer (A) in the toluene solution. Thus, a pressure-sensitive adhesive composition (A) was prepared.

Two commercial release liners (manufactured by Sumika-Kakoushi Co., Ltd., product name: "SLB-80W3D") were prepared. The pressure-sensitive adhesive composition (A) was applied to one surface (release surface) of each of the release liners so that its thickness after drying became 50 μm, followed by drying at 100° C. for 5 minutes. Thus, 50-micrometer thick pressure-sensitive adhesive layers (a first pressure-sensitive adhesive layer and a second pressure-sensitive adhesive layer) each including an acrylic pressure-sensitive adhesive (A) corresponding to the pressure-sensitive adhesive composition (A) were formed on the release surfaces of the two release liners.

A caprolactam-based (ester-based) polyurethane resin film (A) having a thickness of 100 μm (100% modulus=6.5 MPa) was prepared as a base material layer. The first pressure-sensitive adhesive layer and the second pressure-sensitive adhesive layer formed on the two release liners were bonded to the first surface and second surface of the base material layer. The release liners were left as they were on the pressure-sensitive adhesive layers to be used for the protection of the surfaces (pressure-sensitive adhesive surfaces) of the pressure-sensitive adhesive layers. The resultant structure was passed through a laminator at 80° C. (0.3 MPa, speed: 0.5 m/min) once, and was then aged in an oven at 50° C. for 1 day. Thus, a pressure-sensitive adhesive tape (1) was obtained.

Example 2

A pressure-sensitive adhesive composition (B) was prepared in the same manner as in the preparation of the pressure-sensitive adhesive composition (A) in Example 1 except that the usage amount of the isocyanate-based cross-linking agent (manufactured by Tosoh Corporation, product name: "CORONATE L") was changed to 1.8 parts.

Two commercial release liners (manufactured by Sumika-Kakoushi Co., Ltd., product name: "SLB-80W3D") were prepared. The pressure-sensitive adhesive composition (B) was applied to one surface (release surface) of each of the release liners so that its thickness after drying became 20 μm, followed by drying at 100° C. for 5 minutes. Thus, 20-micrometer thick pressure-sensitive adhesive layers (a first pressure-sensitive adhesive layer and a second pressure-sensitive adhesive layer) each including an acrylic pressure-sensitive adhesive (B) corresponding to the pressure-sensitive adhesive composition (B) were formed on the release surfaces of the two release liners.

A caprolactam-based (ester-based) polyurethane resin film (B) having a thickness of 60 μm (100% modulus=6.5 MPa) was prepared as a base material layer. The first pressure-sensitive adhesive layer and the second pressure-sensitive adhesive layer formed on the two release liners were bonded to the first surface and second surface of the base material layer. The release liners were left as they were on the pressure-sensitive adhesive layers to be used for the protection of the surfaces (pressure-sensitive adhesive surfaces) of the pressure-sensitive adhesive layers. The resultant structure was passed through a laminator at 80° C. (0.3 MPa, speed: 0.5 m/min) once, and was then aged in an oven at 50° C. for 1 day. Thus, a pressure-sensitive adhesive tape (2) was obtained.

Example 3

A pressure-sensitive adhesive composition (A) was prepared in the same manner as in Example 1.

Two commercial release liners (manufactured by Sumika-Kakoushi Co., Ltd., product name: "SLB-80W3D") were prepared. The pressure-sensitive adhesive composition (A) was applied to one surface (release surface) of each of the release liners so that its thickness after drying became 10 μm, followed by drying at 100° C. for 5 minutes. Thus, 10-micrometer thick pressure-sensitive adhesive layers (a first pressure-sensitive adhesive layer and a second pressure-sensitive adhesive layer) each including an acrylic pressure-sensitive adhesive (A) corresponding to the pressure-sensitive adhesive composition (A) were formed on the release surfaces of the two release liners.

An ether-based polyurethane resin film (B) having a thickness of 30 μm (100% modulus=5.6 MPa) was prepared as a base material layer. The first pressure-sensitive adhesive layer and the second pressure-sensitive adhesive layer formed on the two release liners were bonded to the first surface and second surface of the base material layer. The release liners were left as they were on the pressure-sensitive adhesive layers to be used for the protection of the surfaces (pressure-sensitive adhesive surfaces) of the pressure-sensitive adhesive layers. The resultant structure was passed through a laminator at 80° C. (0.3 MPa, speed: 0.5 m/min) once, and was then aged in an oven at 50° C. for 1 day. Thus, a pressure-sensitive adhesive tape (3) was obtained.

Example 4

A pressure-sensitive adhesive composition (A) was prepared in the same manner as in Example 1.

Two commercial release liners (manufactured by Sumika-Kakoushi Co., Ltd., product name: "SLB-80W3D") were prepared. The pressure-sensitive adhesive composition (A) was applied to one surface (release surface) of each of the release liners so that its thickness after drying became 10 μm, followed by drying at 100° C. for 5 minutes. Thus, 10-micrometer thick pressure-sensitive adhesive layers (a first pressure-sensitive adhesive layer and a second pressure-sensitive adhesive layer) each including an acrylic pressure-sensitive adhesive (A) corresponding to the pressure-sensitive adhesive composition (A) were formed on the release surfaces of the two release liners.

An ether-based polyurethane resin film (C) having a thickness of 30 μm (100% modulus=2.3 MPa) was prepared as a base material layer. The first pressure-sensitive adhesive layer and the second pressure-sensitive adhesive layer formed on the two release liners were bonded to the first surface and second surface of the base material layer. The release liners were left as they were on the pressure-sensitive adhesive layers to be used for the protection of the surfaces (pressure-sensitive adhesive surfaces) of the pressure-sensitive adhesive layers. The resultant structure was passed through a laminator at 80° C. (0.3 MPa, speed: 0.5 m/min) once, and was then aged in an oven at 50° C. for 1 day. Thus, a pressure-sensitive adhesive tape (4) was obtained.

Comparative Example 1

A pressure-sensitive adhesive composition (A) was prepared in the same manner as in Example 1.

Two commercial release liners (manufactured by Sumika-Kakoushi Co., Ltd., product name: "SLB-80W3D") were prepared. The pressure-sensitive adhesive composition (A) was applied to one surface (release surface) of each of the release liners so that its thickness after drying became 19 μm, followed by drying at 100° C. for 5 minutes. Thus, 19-micrometer thick pressure-sensitive adhesive layers (a first pressure-sensitive adhesive layer and a second pressure-sensitive adhesive layer) each including an acrylic pressure-sensitive adhesive (A) corresponding to the pressure-sensitive adhesive composition (A) were formed on the release surfaces of the two release liners.

A PET base material (D) having a thickness of 12 μm (manufactured by Toray Industries, Inc., product name: "LUMIRROR S10") was prepared as a base material layer. The first pressure-sensitive adhesive layer and the second pressure-sensitive adhesive layer formed on the two release liners were bonded to the first surface and second surface of the base material layer. The release liners were left as they were on the pressure-sensitive adhesive layers to be used for the protection of the surfaces (pressure-sensitive adhesive surfaces) of the pressure-sensitive adhesive layers. The resultant structure was passed through a laminator at 80° C. (0.3 MPa, speed: 0.5 m/min) once, and was then aged in an oven at 50° C. for 1 day. Thus, a pressure-sensitive adhesive tape (C1) was obtained.

TABLE 1

| | | Example 1 | Example 2 | Example 3 | Example 4 | Comparative Example 1 |
|---|---|---|---|---|---|---|
| Construction | Base material layer | A | A | B | C | D |
| | Pressure-sensitive adhesive layer | A | B | A | A | A |
| Thickness (μm) | Pressure-sensitive adhesive layer | 50 | 20 | 10 | 10 | 19 |
| | Base material layer | 100 | 60 | 30 | 30 | 12 |
| | Pressure-sensitive adhesive layer | 50 | 20 | 10 | 10 | 19 |
| | Total thickness | 200 | 100 | 50 | 50 | 50 |
| Thickness ratio | Pressure-sensitive adhesive layers/total thickness | 0.5 | 0.4 | 0.4 | 0.4 | 0.76 |
| Dimensional change ratio | | 0.31 | 0.27 | 0.28 | 0.28 | 0.4 |
| Young's modulus (MPa) | | 7.1 | 9.3 | 9 | 1 | $3.3 \times 10^2$ |
| Maximum stress (MPa) | | 3.2 | 4 | 3.9 | 1.4 | 226 |
| Stress ratio (B/A) | | 0.82 | 0.84 | 0.83 | 0.96 | 0.66 |
| Pressure-sensitive adhesive strength to SUS (N/20 mm) | | 13 | 7.5 | 7.5 | 7 | 9 |
| Bending resistance evaluation | | ○ | ○ | ○ | ○ | x |

INDUSTRIAL APPLICABILITY

The pressure-sensitive adhesive tape of the present invention is excellent in unevenness followability, and hence may be preferably utilized as, for example, a pressure-sensitive adhesive tape to be bonded to a member having a movable bending portion.

REFERENCE SIGNS LIST 1000 pressure-sensitive adhesive tape
100 base material layer
200 pressure-sensitive adhesive layer
200a pressure-sensitive adhesive layer
200b pressure-sensitive adhesive layer

The invention claimed is:

1. A pressure-sensitive adhesive tape, comprising:
   a base material layer; and
   a pressure-sensitive adhesive layer arranged on at least one side of the base material layer,
   wherein the base material layer has a thickness of from 1 μm to 100 μm, and
   wherein the pressure-sensitive adhesive tape has a maximum stress at 100% elongation of from 0.1 MPa to 6.0 MPa at 23° C. and a tensile rate of 300 mm/min,
   wherein the base material layer contains at least one polar functional group-containing polymer selected from a condensation polymer and a polyaddition polymer,
   wherein the polar functional group-containing polymer is at least one kind selected from polyamide, polyurethane, and polyurea, and
   wherein the pressure-sensitive adhesive layer contains at least one kind selected from an acrylic pressure-sensitive adhesive, a rubber-based pressure sensitive adhesive, a silicone-based pressure-sensitive adhesive, and a urethane-based pressure-sensitive adhesive.

2. The pressure-sensitive adhesive tape according to claim 1, wherein the pressure-sensitive adhesive tape has a Young's modulus at 23° C. of from 0.2 MPa to 25 MPa.

3. The pressure-sensitive adhesive tape according to claim 1, wherein a ratio (B/A) between a stress A applied to the pressure-sensitive adhesive tape immediately after the pressure-sensitive adhesive tape is tensioned by 100% at 23° C. and a tensile rate of 300 mm/min, and a stress B after holding of the 100% tension state for 1 second is from 0.7 to 1.0.

4. The pressure-sensitive adhesive tape according to claim 1, wherein the pressure-sensitive adhesive layer has a pressure-sensitive adhesive strength to a SUS plate of 5N/20 mm or more at 23° C., a tensile rate of 300 mm/min, and a peel angle of 180°.

5. The pressure-sensitive adhesive tape according to claim 1, wherein the pressure-sensitive adhesive tape has a total thickness "d" of from 1 μm to 500 μm.

6. The pressure-sensitive adhesive tape according to claim 5, wherein a ratio (d1/d) of a total thickness d1 of the pressure-sensitive adhesive layer to the total thickness "d" is 0.7 or less.

7. The pressure-sensitive adhesive tape according to claim 1, wherein the polar functional group-containing polymer has at least one kind selected from an ether bond and an ester bond.

8. The pressure-sensitive adhesive tape according to claim 1, wherein the thickness of the pressure-sensitive adhesive layer is from 1 μm to 50 μm.

9. The pressure-sensitive adhesive tape according to claim 5, wherein the pressure-sensitive adhesive tape has a total thickness "d" of from 1 μm to 200 μm.

10. The pressure-sensitive adhesive tape according to claim 1, wherein the pressure-sensitive tape is double-sided, and wherein the pressure-sensitive adhesive layer is arranged on both sides of the base material layer.

* * * * *